US 7,827,266 B2

(12) United States Patent  (10) Patent No.: US 7,827,266 B2
Gupta  (45) Date of Patent: Nov. 2, 2010

(54) SYSTEM AND METHOD OF CONTROLLING MULTIPLE COMPUTER PLATFORMS

(75) Inventor: Vinay Gupta, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 521 days.

(21) Appl. No.: 11/831,736

(22) Filed: Jul. 31, 2007

(65) Prior Publication Data

US 2009/0037551 A1 Feb. 5, 2009

(51) Int. Cl.
G06F 15/173 (2006.01)

(52) U.S. Cl. ............... 709/223; 709/217; 709/219; 709/224

(58) Field of Classification Search ........... 709/217, 709/219, 223, 224
See application file for complete search history.

(56) References Cited

U.S. PATENT DOCUMENTS

| 5,617,527 | A | 4/1997 | Kressin et al. | |
| 7,321,929 | B2* | 1/2008 | Rolfe | 709/223 |
| 7,433,931 | B2* | 10/2008 | Richoux | 709/217 |
| 2003/0037177 | A1* | 2/2003 | Sutton et al. | 709/316 |
| 2005/0027841 | A1* | 2/2005 | Rolfe | 709/223 |
| 2005/0235055 | A1* | 10/2005 | Davidson | 709/223 |
| 2006/0075079 | A1* | 4/2006 | Powers et al. | 709/220 |
| 2008/0148219 | A1* | 6/2008 | Ousterhout et al. | 709/223 |
| 2008/0256241 | A1* | 10/2008 | Graser et al. | 709/226 |

OTHER PUBLICATIONS

Sorzano, et al., Command-line interfaces can be efficiently brought to graphics: COLIMATE (the COmmand LIne Mate), Software-Practice and Experience, 2002; 32:873-887.

* cited by examiner

Primary Examiner—Phuoc Nguyen (57) ABSTRACT

A system and method are provided for controlling multiple computer platforms. The method can include the operation of storing command line tasks in a database. Other command line task information can include a command name, related parameters, and a platform type for which the command line tasks are executable. A command line task can be selected from the database of command line tasks by a user for application to computing systems. A further operation is identifying at least one computing system that can be addressed from a host system and which has the same platform type as the selected command line task. The user can then select at least one computing system from a list of the identified computing systems to which the selected command line is applicable. Another operation is applying the selected command line tasks to the selected computing systems which are of a correct platform type.

24 Claims, 7 Drawing Sheets

| Edit Cluster Management Tasks – Web Browser | _ □ X |
|---|---|

File  Edit  View  Favorites  Tools  Help

◉ Back    Forward  Stop  ☆ Favorites

Address: https://hscnc-1.caclab.cac.cpqcorp.net:50000    → Go

This task configures a network interface

| ☑ | Component/System | Type |
|---|---|---|
| ☑ | drifter.caclab.cac.cpqcorp.net | Linux |
| ☑ | fathom.cuplab.cac.cpqcorp.net ─── 502 | Linux |

Interface Name: `eth2`

IP Address Family Type: `inet ▼`

IP Address: `16.100.80.100`

☑ Network Mask: `155.150.200.0`

☐ IPv6 Address to Add (Address/Prefix Length):

☐ IPv6 Address to Delete (Address/Prefix Length):

☐ Tunnel Destination:

☐ ARP Protocol Use (arp – Enable, -arp, Disable):

☐ Promiscuous Mode (promisc -Enable, promisc – Disable)

☐ All-Multicase Mode (allmulti – Enable, -all – Disable):

☐ Point-to-Point Mode (pointtopoint to enable, -pointtopoint to disable)

☐ Broadcase Mode (broadcast to enable, -broadcast to disable)

☐ Interface Metric:

☐ Maximum Transfer Unit (MTU)

☐ Start I/O Address

☐ Transmit Queue Length:

SYSTEM AND METHOD OF CONTROLLING MULTIPLE COMPUTER PLATFORMS

BACKGROUND

In current computing environments, it is fairly common for multiple platforms and operating systems to work together within a networked environment to provide a complete customer solution. An example of this might be a Microsoft Windows® or Linux server running an application, which communicates with a HP NonStop® server back-end where the transaction and database engines reside. For these kinds of heterogeneous environments, system management becomes a challenge. This challenge can be in four basic areas: 1) System booting, 2) System monitoring, 3) System configuration, and 4) System control.

One solution is to provide a management interface for integrated boot, monitoring, configuration, and integrated control of all managed systems. Although the networked environment may be based on multiple platforms, the system administrator or the operator should feel that they are working on one platform.

However, the problem of seamlessly integrated, centralized configuration and control is difficult to solve. This is because all operating systems have their own user interfaces for configuration and control of the respective platforms. Many operating systems or platforms have GUIs (graphical user interfaces) for system configuration and control, but practically all platforms have some command-line based configuration and control. Unfortunately, the syntax of such text commands is significantly different on each operating system. In order to operate the separate heterogeneous platforms effectively, the user needs to know the syntax of all of the commands on all of the managed systems. This is a difficult task for most system administrators.

Another reason why centralized configuration and control continues to become more problematic is because there are an expanding number of hardware devices and software systems to configure and control. For example, kernels, disk and file systems, networks, transactions, databases, backup/restore, etc. all need to be configured and controlled.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A system and method are provided for controlling multiple computer platforms. The overall system will be described with reference to FIG. 1 and additional references to the graphical interface embodiments illustrated in FIGS. 2-6 will be made for many of the elements in FIG. 1.

Figure 1:
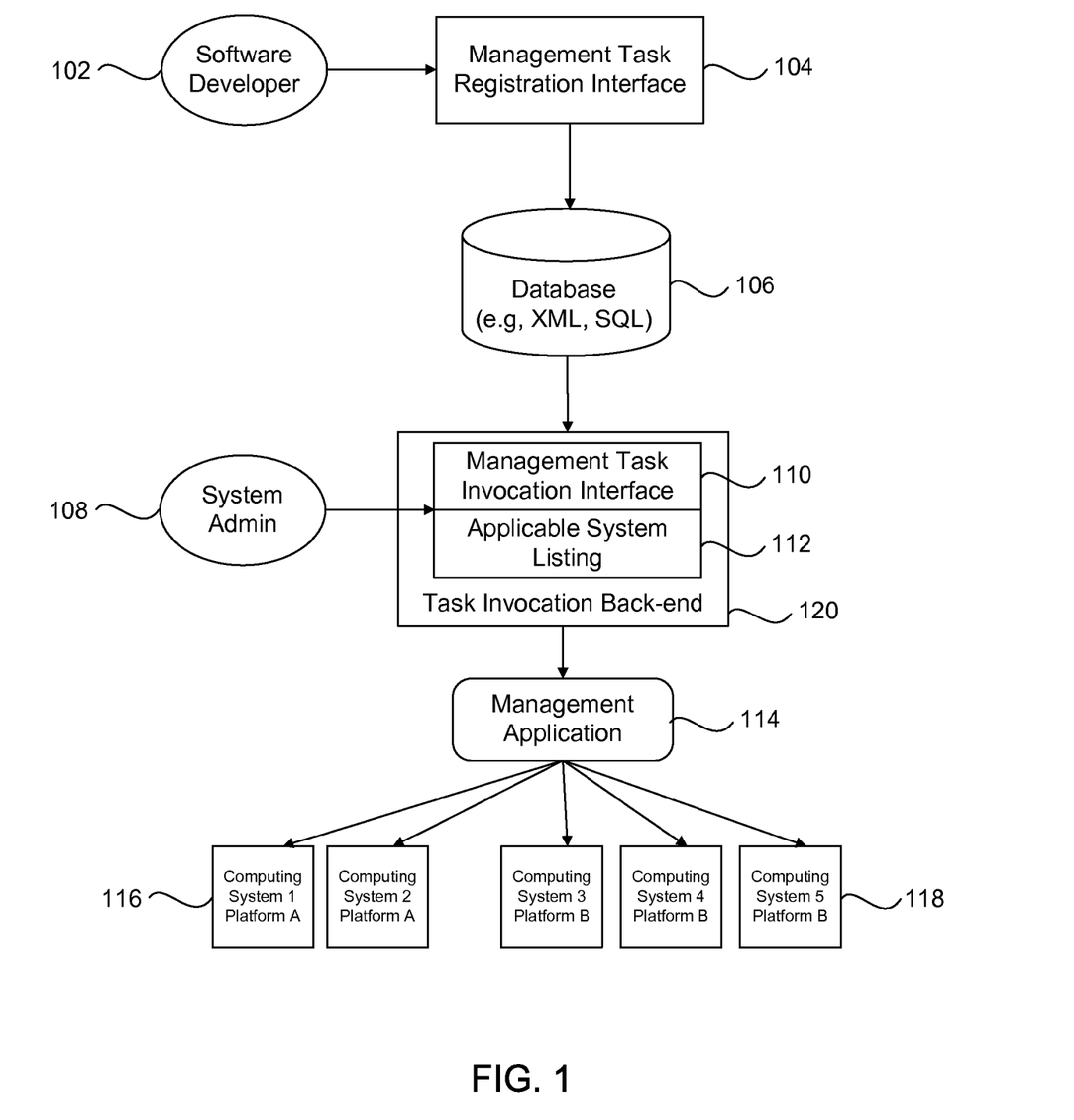
FIG. 1 is a block diagram of a system for controlling multiple computer platforms in accordance with an embodiment.

The system can include a management task registration interface 104 configured to enable entry of command line tasks, parameter listings, and command descriptions by a user or software developer 102. The command line tasks can be stored in a database 106 in an XML format, SQL format, flat file format, or in another known database format that is useful for this system.

A platform type for the command line tasks can also be stored in the database. The platform type can describe a platform type on which an individual command line task or group of command line tasks are applicable. For example, certain types of command line tasks can be applied to Linux, while others can be applied to Microsoft® Windows, UNIX®, IBM® mainframes, etc.

Figure 2:
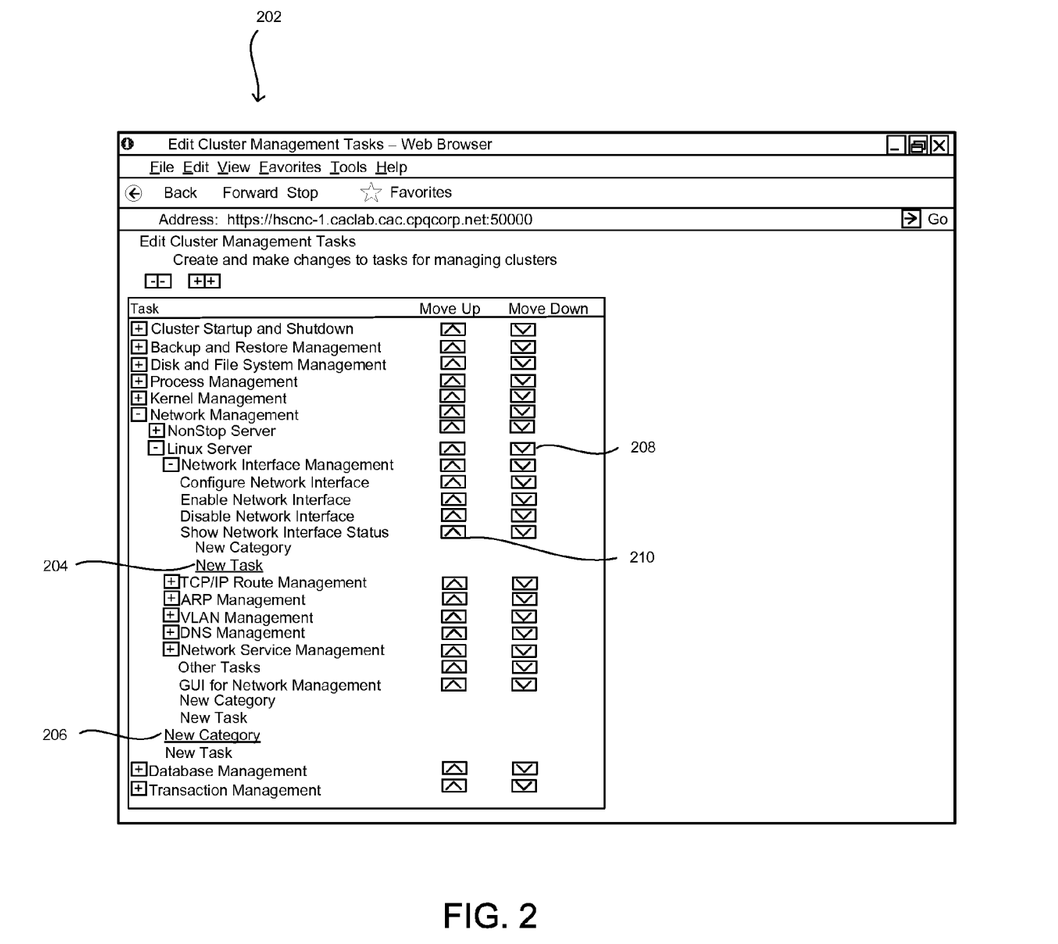
FIG. 2 illustrates an embodiment of a task registration interface.

FIG. 2 illustrates an embodiment of a management task registration screen 202 for a management task registration interface, where various management tasks can be registered using a web-based GUI (graphical user interface). The user can launch the management task registration interface that is configured to address a cluster of heterogeneous systems and select "New Task" 204 or "New Category" 206 to add a new task or a new category to the task listing. The tasks and categories can also be moved in the tree control by using the move up control 210 and move down control 208.

Figure 3:
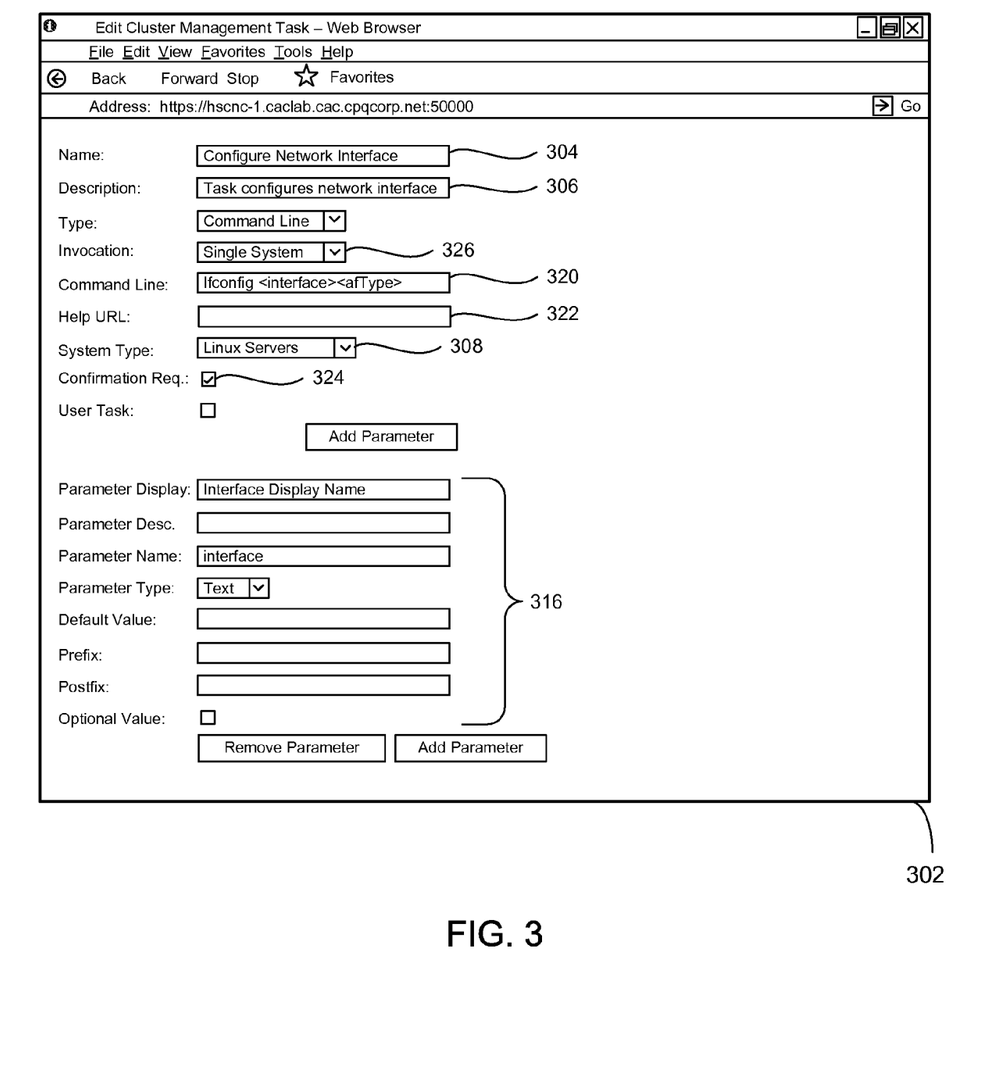
FIG. 3 illustrates an embodiment of a graphical interface for entering data into a task registration interface.

FIG. 3 illustrates an embodiment of a graphical interface for entering data into a task registration interface 302. The window of FIG. 3 may be accessed by clicking on "New Task" in the management task registration screen (FIG. 2) or by editing an existing task from the same screen. The example screen enables a user or software developer to enter, edit and modify task related information and parameters. This GUI screen enables the software developer to enter the task name 304, a short task description 306, and what kind of platform the task is applicable on 308.

Parameters can be added as a separate grouping or task record because each task may have multiple parameter groups. Only one example parameter group is shown in FIG. 3. The information for the parameter options 316 can be entered, such as the user understandable display name, the parameter's functional description, and parameter type 316 for the parameter values. The parameters can be of all general types, such as text, list, or Boolean. For each parameter that the command line takes, the user can also provide: a valid value type, any default value that is automatically populated, any prefix/postfix that is passed to the command line when this parameter is supplied, and whether the parameter is required or optional 316. If the parameter type is a list, user may provide the valid list value options. Other information the software developer or user can provide is a help link 322, whether confirmation is required or not 324, how many systems the task can be run on simultaneously 326, etc.

Although the example system is described for underlying command line communications, the management task registration may support other kinds of tools, such as URL-based or native application-based text string communications.

The task registration interface also allows developers or system administrators to define the management tasks in a displayable structure, which can be adaptable to various unique customer environments. For example, a base set of platform commands may be provided with the management application for the platforms being used within a customer's network and then the command tasks can be modified based on the special needs or unique network configurations of the customer's systems.

The present system also supports the use of templates so that similar tasks do not have to be re-entered again and again. The back-end of the management task registration interface creates a database entry or file for every task. This database entry stores the input information for that command line task. A previously entered command or category can be opened as a template and then used to develop and save a new command line task.

Referring again to FIG. 1, a management application 114 can be configured to identify at least one computing system 116, 118 that can be addressed by the management application. This means that the management application can recognize the servers, clients, network attached storage, printers, and other computing devices that the management application has rights to administer. In addition, the management application can identify the platform type of the computing systems. For example, the management application can identify or retrieve the type of computing system with which the management application is able to communicate from a pre-programmed database and the rights to execute commands through a command line interface.

The system can also include a management task invocation interface 110 that is in communication with the management application 114 as in FIG. 1. This management task invocation interface can be configured to enable a user or system administrator 108 to select a task from the task listing along with applicable computing systems from a listing 112. The task is selected because the user desires to apply the command to one or more computing systems.

Referring to FIG. 1, an applicable system listing display 112 can be provided that is associated with or located in the management task invocation interface. The applicable list display can be configured to present a list of computing systems 116, 118 to which tasks can be applied by the management application 114. The computing systems are displayed based on the platform type stored for the task (or command line task) and the platform type of the systems. For example, if the selected task is applicable only to computing systems of Platform A type 116 then only the computing systems from the Platform A group will be displayed. It is helpful to the system administrator to be able to know immediately which computing systems or servers the selected task is applicable to. Otherwise, the system administrator can waste a significant amount of time looking up server addresses and platform types each time a task was selected.

The applicable list display can be simultaneously displayed with a graphical form used by the management task invocation interface to enable a user to view a task name and enter related task parameters. The graphical form may include text boxes for entry of the task parameters and prompts to remind the end user what type of parameters the task can use.

Figure 4:
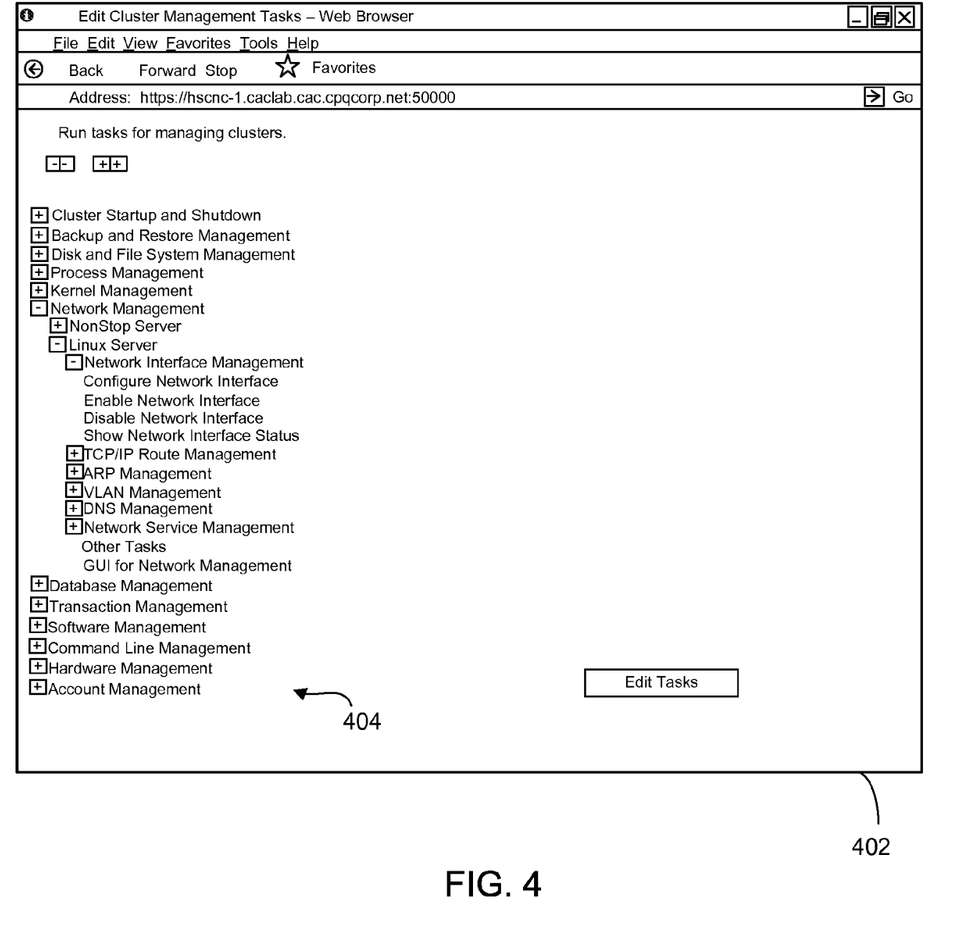
FIG. 4 illustrates a management task invocation interface in an embodiment.

FIG. 4 illustrates an example of a management task invocation interface 402. The user can launch the management task invocation interface for a cluster of heterogeneous systems in a web browser or an executable application. Based on the database entries created by the management task registration interface, the management task invocation interface displays a list of tasks in a tree control 404 representing a hierarchy of management tasks. The task invocation phase can use the database entries or XML files generated in the management task registration phase to generate the usable command line text string(s) for the desired command line interface.

The use of a graphical tree interface with the management task invocation interface allows the tasks to be grouped in task types which can be browsed through by the user. This improves administration efficiency because the user does not have to remember the exact command syntax but the user can browse to the category or technical subsystem of the command they want to perform.

The management task invocation interface may also present the user with a task description that is associated with a stored command line task. Presenting a detailed description of the task function or a more descriptive name helps the user to select a command line task to be executed without having to remember the actual command syntax or even spelling. Quite often the command name for a command line control is hard to spell, may be shorthand for some other term, or can be entirely unrelated to the job the command performs. So, seeing a short description or a detailed description of the task function helps users to more quickly find and execute the command. The user may then select a particular task from the task tree that the user wants the system to perform.

Figure 5:
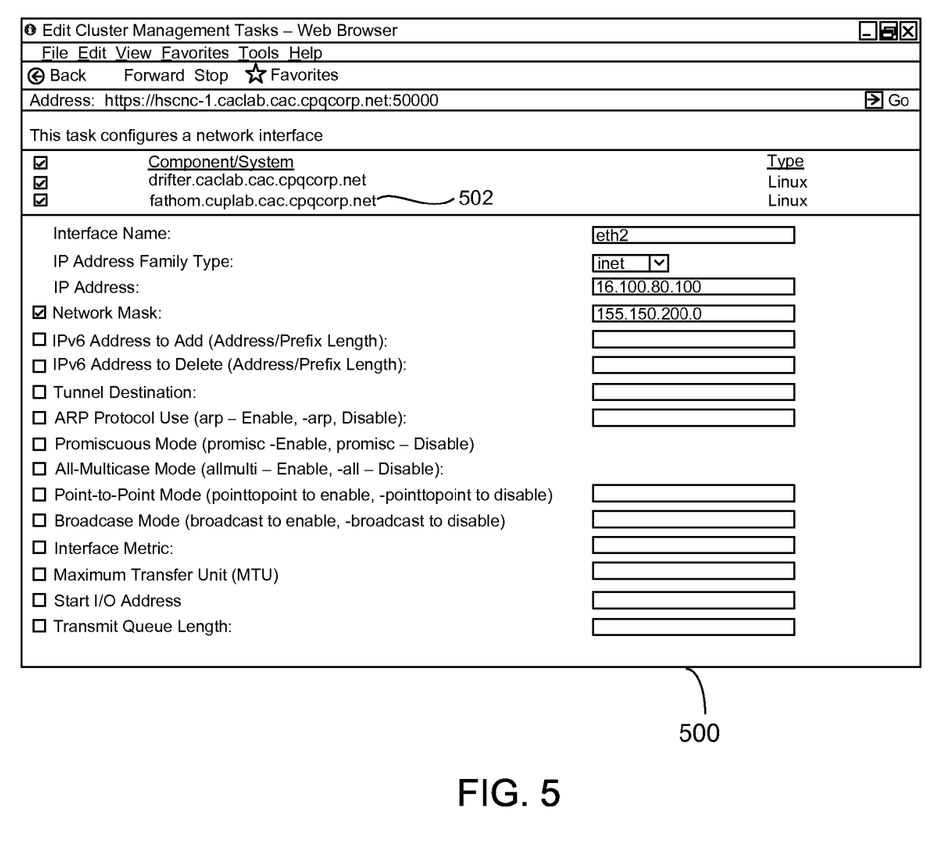
FIG. 5 illustrates a graphical user interface for entering parameters and related command information in an embodiment of a management task invocation interface.

FIG. 5 illustrates a graphical user interface 500 for entering the parameter values for the selected task. The various computing systems and subsystems 502 to which the commands are applicable within the network can be displayed using the information from the database entries created during management task registration. When a user selects a management task and one or more systems to perform that task on, the human-understandable parameter values are requested by the system using an interface screen such as the screen of FIG. 5. The parameter interface 500 displays a human-friendly interface to ask for the values of the parameters that are required or optional to perform the task. The user selects the systems the task needs to be performed on and provides the values for all the required parameters for the task, plus any optional parameters. This interface may include the use of text boxes, radio buttons, drop-down lists, or other graphical controls to enter the parameters for a command. This is very useful for the user performing the tasks as the parameters in command lines are very difficult to remember and vary widely from one platform to another platform.

After the management task invocation interface has collected the command parameters through the graphical interface, the management task invocation interface can validate the parameter values entered by the user. The back-end validates the parameter values and builds the actual command line string, based on the task registration information. When the parameters, command line flags, and other related command information have been verified, then the task invocation back-end 120 (FIG. 1) can construct a command line string to be executed on the selected computing systems based on the stored command line task.

Sometimes the entered parameters can be recognized as being incorrect when they are received through the graphical user interface and an error can be returned to the user by the task invocation interface. In other words, pre-processing for errors before the command line task strings are sent to the computing system can be used where desired. This avoids receiving many error messages from the multiple systems to which the commands will be applied. As a result, the user may receive one error instead of ten repeated errors from the target systems.

The task invocation back-end 120 and/or management application 114 invokes the underlying command line on the selected systems, taking the values supplied by the users and substituting them as the values for the appropriate command line parameters. To issue a command securely, a web-based SSH (Secure Shell) client may be used. The SSH client can take a well-formed command (with all parameters substituted) and issue the command to the managed system over SSH.

The management task invocation back-end applies the selected command line tasks to the selected computing system using the native command line interface on the selected computing systems. This can be as simple as opening a command line shell on the target computing system and then sending the concatenated command and parameters to the command line shell or SSH, as described above.

Using the native command line interface also means that no additional special agents need to be coded for the system. Even if the underlying code for executing the command line interface changes on the target platform side, this present system will continue to operate properly as long as the command names and parameters on the target systems do not change. Even if there are changes to the command line syntax, these changes can usually be more easily accommodated by making minor syntax changes than by having to recode an entire special agent that is used in many previously existing multi-platform control systems.

Figure 6:
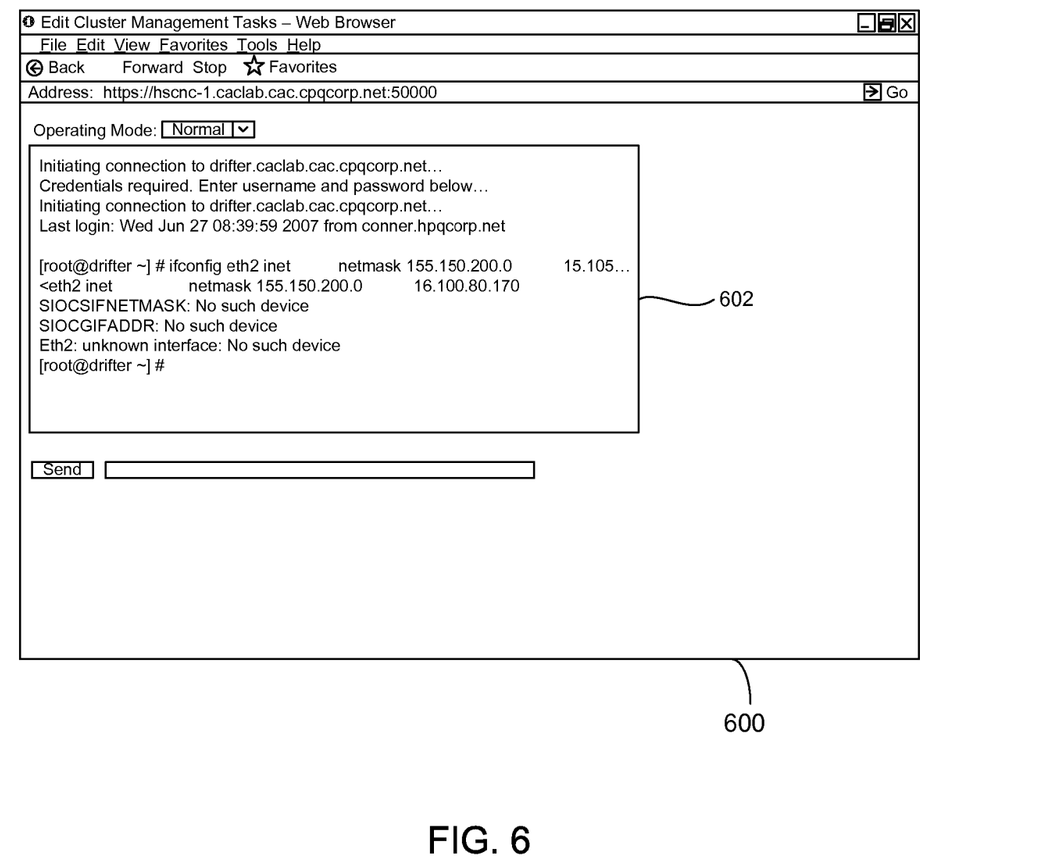
FIG. 6 illustrates an embodiment of a terminal output screen that displays the native output of the command line to the user.

FIG. 6 illustrates one embodiment of a screen 600 that displays the native output of the command line displayed to the user. The command output is displayed to the user natively 602 (i.e. without parsing). This native display avoids problems with converting or translating the display. The user simply receives a copy of the report from the target computing system regarding what the command line response was.

In the past, it has been difficult to provide integrated configuration and control for a heterogeneous multi-tier computing environment with multiple software platforms. The present system and method does not use a specialized management agent or additional software deployed on the managed systems. This system avoids the installation, upkeep or management of an additional layer of software on the managed systems. In addition, this system and method provides complete virtualization of the configuration and control of the entire computing environment and the operator does not have to learn any command syntax. Support for new platforms can later be provided by adding command line tasks and without writing any code on the managed system or in a management application.

By using a database driven system and graphical user interface configured for command line control, computing systems can be configured and controlled via a command-line based (non-GUI) command or script for any platform. In one embodiment, the management application can use a remote shell for communication between the management application and the operating system.

Integrated configuration and control has been attempted in the past using various different approaches. It is helpful to understand some of the past approaches used industry-wide, and compare prior approaches with the present system and method to understand the value of the present embodiments.

One prior method of administering multiple disparate platforms has been the use of an integrated GUI with backing agents on each separate computing system. In this approach, an integrated GUI mitigates the differences between the various platforms, and provides the user with an integrated interface to perform configuration and control across various platforms. In the back-end, the system communicates with specially-developed agents using the proprietary API (application program interface), then parses the output, and displays the output to the user.

In contrast, the present system and method is valuable because special agents are not required on the managed systems. The system uses the command lines and scripts that already exist on the managed systems. This approach is especially effective when trying to integrate legacy platforms with the state-of-the-art platforms.

An alternative prior art system for managing heterogeneous platforms is the use of an integrated GUI with output parsing. In this prior approach, the integrated GUI controls the computing systems using a specialized software layer and specialized agents, but the system parses the output before it displays the output to the user. This approach has two disadvantages. One disadvantage is that if the output format changes, the interface is likely to break. Second, there is an extra development effort to parse and/or format all the output from the underlying command line tools. Compared to this approach, the embodiments described herein do not parse any output, because the present system and method relies on the human-readability of the command shell output from command line tools.

A third prior art method for managing disparate software systems has been SMASH (Systems Management Architecture for Server Hardware). This initiative from DMTF (Distributed Management Task Force) tries to unify the command lines for control of server hardware. This is an idealistic solution at best. This system requires SMASH agents on the managed systems, and it works only to control hardware. The present system and method is valuable as compared to SMASH because this system is extendable to support any heterogeneous or homogenous clusters without writing any code on the managed system or in the task registration or task invocation infrastructure.

Figure 7:
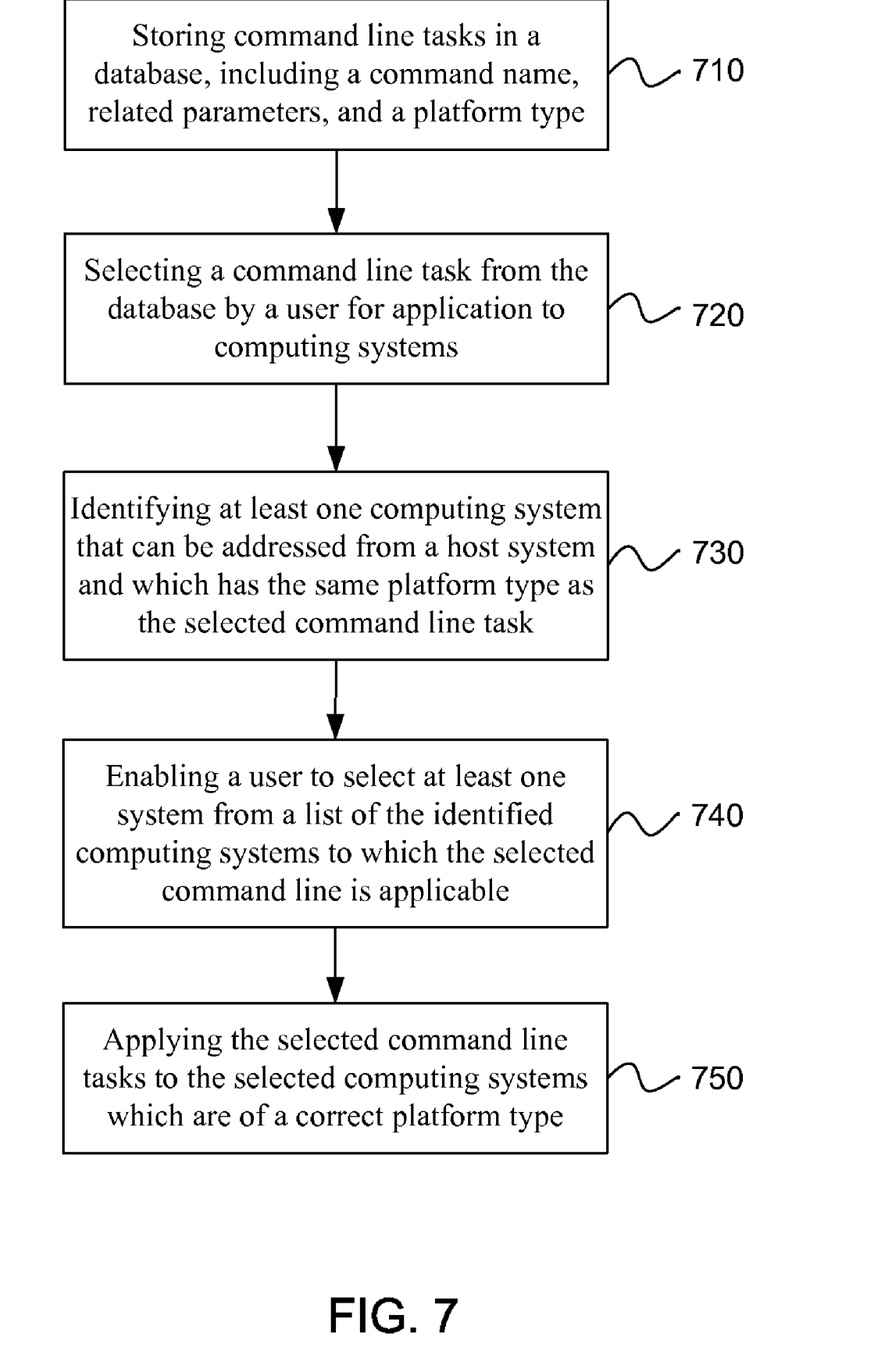
FIG. 7 is flowchart illustrating an embodiment of a method for controlling multiple computing platforms.

FIG. 7 illustrates an embodiment of a method of controlling multiple computer platforms. One operation in the method can be storing command line tasks in a database, as in block 710. The stored command line tasks can include a command name, related parameters, and a platform type on which the command line tasks are executable. The database of command line tasks can be generated by a software developer or user who enters the command tasks, parameter prompts, help descriptions, and sets up other definitions for the graphical interface. The database may store a command line name, related command line parameters, and a platform type upon which the command line tasks are applicable in the database.

A command line task can be selected from the database of command line tasks by a user, as in block 720. The user can also be presented with a task description that is associated with a stored command line task to make it easier to find the desired command line task. The command line tasks can be presented as a graphical tree view of command line tasks in order to divide command line tasks into groupings. Alternatively, the command line tasks may be displayed in a list box, drop down list window, scrollable page or another suitable known graphical interface.

The database can store certain information for the command line tasks, such as: the command name, description, underlying command line format, parameters, and concurrent execution maximum for the command line tasks. The database may store the command and parameter information in an XML or relational database accessible to a management application.

These tasks can then be used by applying the tasks to target computing systems. To be able to apply the tasks, at least one computing system will be identified that can be addressed from a host system, as in block 730. The identified computing system will have the same platform type as the selected command line task. This is so that selected command line task can be applied to a compatible system with the defined command and syntax.

A graphical interface can be provided to allow the user to enter parameter values for the command line into text box entry controls and interfaces viewed by a user. Each of the text entry boxes may display the parameter name and description. The entry interface can be displayed after the user invokes a command line task. Other types of parameters may be a command flag which only has specific alternate choices that can be selected. In this case, a radio button or some other graphical control can be used which only allows one flag choice to be accepted by the system. The parameter values entered by the user can be validated, and the command line to be executed on the selected computing systems can then be constructed based on the stored command line tasks.

The user can then select at least one computing system from a list of the identified computing systems, as in block 740. The list of systems to which command line tasks are applicable can be found by the host by filtering the platform type of the computing systems accessible to the host or management application by the platform type stored for the command line task. Checkboxes, list boxes or other selection interfaces can be used to select or de-select the computing systems to which the selected command line is finally applied.

The selected command line tasks can then be applied to the selected computing systems which are of a correct platform type, as in block 750. As discussed previously, the user chosen command line task (or tasks) can be applied to the selected computing systems using the native command line interface of the selected computing systems. The selected command line task will frequently be applied to the selected computing systems of the matching platform type on a local area network (LAN) or wide area network (WAN). However, the computing systems may be outside a LAN or WAN as long as the user or management application has the rights to login and execute command lines on the computing system.

The system and method described herein can be used for virtualized configuration and control of Next Generation Data Centers (NGDC) where different platforms are harnessed to work together. In a more localized application, virtualized configuration can be applied to multiple platforms or computing devices that are located within a single physical box or single motherboard. For example, the present system can be used to support multi-core systems where separate cores are each running a separate operating system. In a similar manner, the application of command line tasks can be applied to an enclosure of server blades where each separate blade may run a separate operating system or platform.

This integrated configuration and control infrastructure provides functionality that is desirable to end users and system administrators. Invariably, the syntax of text commands is different on different operating systems, and in the past, a user has needed to know the syntax of all of the commands on all of the managed systems to be able to manage a heterogeneous environment. With this system and method, the operator never has to learn the entire command syntax. In particular, users like being able to avoid learning the syntax of, for example, how to configure a network route on Linux versus NonStop or Windows. Being able to prompt a user through a command line task makes the command line control easier to use.

These described embodiments also show the scalability of the solution, which is a challenge when trying to solve a heterogeneous computing environment problem. The present system can be applied to a vast number of computing systems within a network without creating a significant burden on network communication resources.

Other valuable points of the described embodiments are that no management agents or any other software is required on the managed systems. This results in providing a complete virtualization of all the configuration and control for the whole computing environment.

It is to be understood that the above-referenced arrangements are only illustrative of the application for the principles of the present invention. Numerous modifications and alternative arrangements can be devised without departing from the spirit and scope of the present invention. While the present system and method has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method of controlling multiple computer platforms, comprising:
storing a command line task for a plurality of tasks in a database, wherein the command line task for each task is stored for each of the multiple computer platforms for which the command line task is executable, each command line task including a command name, related parameters, and a platform type;
associating the command line task for one of the plurality of tasks for each of the multiple computer platforms with a task description in the database;
selecting the task description for one of the plurality of tasks from the database by a user, for application of the associated command line task to computing systems having at least one of the multiple computer platforms;
identifying the computing systems on which the associated command line task is executable;
enabling the user to select at least one computing system from a list of the identified computing systems on which the associated command line task is executable; and
applying the associated command line task to the selected computing systems.

2. A method as in claim 1, wherein the step of applying the selected command line task further comprises the step of applying the selected command line task to the selected computing systems using a native command line interface on the selected computing systems.

3. A method as in claim 1, wherein the step of applying the associated command line task further comprises the step of validating parameter values entered by the user and constructing the command line to be executed on the selected computing systems based on the stored command line tasks.

4. The method of claim 1, wherein the step of storing command line tasks in a database further comprises the step of generating a plurality of command line tasks by storing the command name, description, underlying command line format, parameters, and concurrent execution maximum for the command line tasks in the database.

5. The method of claim 4, further comprising the step of generating a graphical parameter listing and data entry interface capable of being viewed by a user.

6. The method of claim 1, further comprising the step of storing the plurality of command line tasks in an XML or relational database accessible to a management application.

7. The method of claim 1, further comprising the step of applying the associated command line task to the selected computing systems on a local area network (LAN) or wide area network (WAN).

8. A method of controlling multiple computer platforms, comprising:
generating a database of command line tasks accessible by a management application;
storing a command line name, related command line parameters, and a platform type upon which the command line tasks are applicable in the database;
identifying at least one computing system that can be accessed by the management application and the at least one platform type of the computing system;
selecting a command line task from the database of command line tasks via user interaction;
presenting a list of systems to which the command line task can be applied based on the platform type stored for the command line task as compared to the platform type of the computing systems;
enabling a user to select at least one computing system from the presented list of computing systems which have the same platform type as the command line task; and
applying the selected command line tasks to the selected computing systems which are of the same platform type as the command line task using the management application.

9. A method as in claim 8, wherein the step of applying the selected command line tasks further comprises the step of applying the selected command line tasks to the selected computing systems using a native command line interface on the selected computing systems.

10. A method as in claim 8, wherein the step of applying the selected command line tasks further comprises the step of validating parameter values entered by the user and constructing the command line to be executed on the selected computing systems based on the stored command line tasks.

11. A method as in claim 8, wherein the step of selecting a command line task further comprises the step of presenting the user with a task description for a stored command line task.

12. The method of claim 8, wherein the step of generating a database of command line tasks further comprises the step of generating a new command line task by storing the command name, command description, underlying command line format, and concurrent execution maximum.

13. The method of claim 12, further comprising the step of storing a parameter listing in the database.

14. The method of claim 8, further comprising the step of supplying a graphical user interface that is enabled to accept parameters for the command line tasks when the user invokes a command line task.

15. The method of claim 8, further comprising the step of generating a graphical user interface enabled to accept parameters for the command line tasks using text box entry controls and a displayed parameter name and description.

16. The method of claim 8, wherein the step of selecting a command line task further comprises the step of presenting a graphical tree view of command line tasks in order to divide command line tasks into groupings.

17. The method of claim 8, wherein the step of presenting a list of computing systems further comprises the step of enabling the computing systems contained in the list of computing systems be selected or de-selected depending on whether the user wants to apply the selected command line task to the computing systems.

18. The method of claim 8, further comprising the step of applying the selected command line tasks to the selected computing systems which are of a correct platform type on a local area network (LAN) or wide area network (WAN).

19. A system for controlling multiple computer platforms, comprising:
a database for storing command line tasks including a platform type of the multiple computer platforms for which the command line tasks are executable;
a management task registration interface configured to enable entry of command line tasks and parameter listings by a user into the database;
a management application configured to identify at least one computing system that can be addressed by the management application and to identify the computer platform type of the computing systems;
a management task invocation interface, in communication with the management application, configured to enable a user to select a command line task from the database based on a task description that a user desires to apply to at least one of the multiple computer platforms; and
an applicable list display, in the management task invocation interface, configured to present a list of computer platforms to which command line tasks can be applied by the management application based on the computer platform type stored for the command line task and the computer platform type.

20. A system as in claim 19, further comprising a graphical form used with the management task invocation interface to enable a user to view a command name and command description, and enter related command parameters.

21. A system as in claim 19, further comprising a graphical tree interface used with the management task invocation interface.

22. A system as in claim 19, wherein the management task invocation interface applies the selected command line tasks to the selected computing systems platforms using a native command line interface on the selected computing platforms.

23. A system as in claim 19, wherein the management task invocation interface validates parameter values entered by the user and constructs a command line to be executed on the selected computing systems based on the stored command line tasks.

24. An article of manufacture including a non-transitory computer usable medium having computer readable program code embodied therein for controlling multiple computer platforms, comprising computer readable program code to perform the operations of:
storing a command line task for a plurality of tasks in a database, wherein the command line task for each task is stored for each of the multiple computer platforms for which the command line task is executable, each command line task including a command name, related parameters, and a platform type;
associating the command line task for one of the plurality of tasks for each of the multiple platforms with a task description in the database;
selecting the task description for one of the plurality of tasks from the database of command line tasks by a user, for application of the associated command line task to computing systems having at least one of the multiple computer platforms;
identifying each of the computing systems on which the associated command line task is executable;
enabling the user to select at least one computing system from a list of the identified computing systems on which the associated command line task is executable; and
applying the associated command line task to the selected computing systems.

* * * * *

UNITED STATES PATENT AND TRADEMARK OFFICE
CERTIFICATE OF CORRECTION

PATENT NO. : 7,827,266 B2  Page 1 of 1
APPLICATION NO. : 11/831736
DATED : November 2, 2010
INVENTOR(S) : Vinay Gupta It is certified that error appears in the above-identified patent and that said Letters Patent is hereby corrected as shown below:

In column 10, line 33, in Claim 22, before "platforms" delete "systems".

Signed and Sealed this
Fourteenth Day of June, 2011

David J. Kappos
*Director of the United States Patent and Trademark Office*